United States Patent
Yates

(10) Patent No.: US 6,729,477 B2
(45) Date of Patent: May 4, 2004

(54) FLUID FILTER RETAINER AND SEAL APPARATUS

(75) Inventor: Brian G. Yates, Holly Springs, NC (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/138,608

(22) Filed: May 3, 2002

(65) Prior Publication Data

US 2003/0205521 A1 Nov. 6, 2003

(51) Int. Cl.[7] .............................................. B01D 27/08
(52) U.S. Cl. ...................... 210/443; 210/450; 277/918
(58) Field of Search ................................. 210/440, 443, 210/444, 450, DIG. 17; 277/918

(56) References Cited

U.S. PATENT DOCUMENTS

| | | | | |
|---|---|---|---|---|
| 3,076,551 A | * | 2/1963 | Humbert, Jr. ............... | 210/232 |
| 3,265,213 A | * | 8/1966 | Decker et al. .............. | 210/136 |
| 3,490,597 A | * | 1/1970 | Casaleggi ................... | 210/443 |
| 3,722,691 A | * | 3/1973 | Francois ..................... | 210/304 |
| 4,057,502 A | * | 11/1977 | Crumrine et al. .......... | 210/440 |
| 4,721,563 A | * | 1/1988 | Rosaen ........................ | 210/85 |
| 5,722,456 A | * | 3/1998 | Schumacher et al. ....... | 137/550 |
| 6,230,900 B1 | * | 5/2001 | Hara et al. .................. | 210/443 |

* cited by examiner

Primary Examiner—Matthew O. Savage
(74) Attorney, Agent, or Firm—Barnes & Thornburg

(57) ABSTRACT

A sealing ring is anchored to a filter retainer included in a fluid filter assembly. An insert-molding process is used to anchor the sealing ring to the filter retainer.

18 Claims, 4 Drawing Sheets

FLUID FILTER RETAINER AND SEAL APPARATUS

BACKGROUND

The present disclosure relates to fluid filters, and in particular to oil filter assemblies for use in a vehicle. More particularly, the present disclosure relates to engine sealing gaskets included in oil filter assemblies.

Oil filters are used to clean lubricating oil passed through stationary or vehicle-mounted internal combustion engines. Such oil filters function during engine operation to extract carbon deposits that result from burning of fuel, debris resulting from engine wear, rust from metal engine components, and other solid contaminants from such lubricating oil. Engine makers prescribe periodic replacement of engine oil filters. Other filters are used to filter fuel, coolant, and hydraulic fluids Sealing gaskets are used to establish sealed connections between engine blocks and oil filters mounted on engine blocks. These sealed connections block leakage of oil to the surroundings as oil flows back and forth between the engine block and an oil filter mounted on the engine block.

SUMMARY

According to the present disclosure, a fluid filter assembly comprises a filter housing, a filter module located in a filter chamber provided in the filter housing, and a filter retainer coupled to the filter housing to retain the filter module in the filter retainer. A sealing ring is anchored to the filter retainer so that the sealing ring is not separated easily from the filter retainer during installation of the oil filter assembly in a vehicle.

In an illustrative embodiment, the filter retainer includes a ring mount formed to include an annular channel and a series of connector apertures opening into the annular channel. The sealing ring includes an upwardly facing annular sealing strip arranged on one side of the filter retainer to face upwardly toward the filter module and a downwardly facing annular sealing strip arranged on an opposite side of the filter retainer to face downwardly away from the filter module. The sealing ring further includes a connector located in the annular channel and arranged to extend through each connector aperture to interconnect the upwardly and downwardly facing annular sealing strips so as to anchor the sealing ring to the ring mount of the filter retainer.

In an illustrative process, a plastics material is injected into a sealing ring mold cavity containing the filter retainer to overmold the filter retainer with the plastics material to produce a sealing ring anchored to the filter retainer. Portions of the molded sealing ring extend through a channel and apertures formed in the filter retainer during the overmolding process to anchor the sealing ring to the filter retainer. Such anchoring makes it less likely that the sealing ring will separate from the filter retainer during handling and installation of the fluid filter assembly at a vehicle assembly plant.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 7 is a sectional view of a plastic injection mold having an upper mold portion and a lower mold portion arranged to lie in spaced-apart relation to the upper mold portion and showing a pre-formed metal filter retainer after it has been moved into a space provided between the "opened" upper and lower mold portions;

FIG. 8 is a sectional view of the mold of FIG. 7 after movement of the upper and lower mold portions to mate with one another and form a mold cavity containing the filter retainer; and FIG. 9 is a sectional view similar to FIG. 8 showing injection of a plastics material by a plastics material injector into a channel formed in the upper mold portion to fill the mold cavity to "over-mold" the plastics material onto the filter retainer to form a sealing ring anchored to the filter retainer.

DETAILED DESCRIPTION OF THE DRAWINGS

Figure 1:
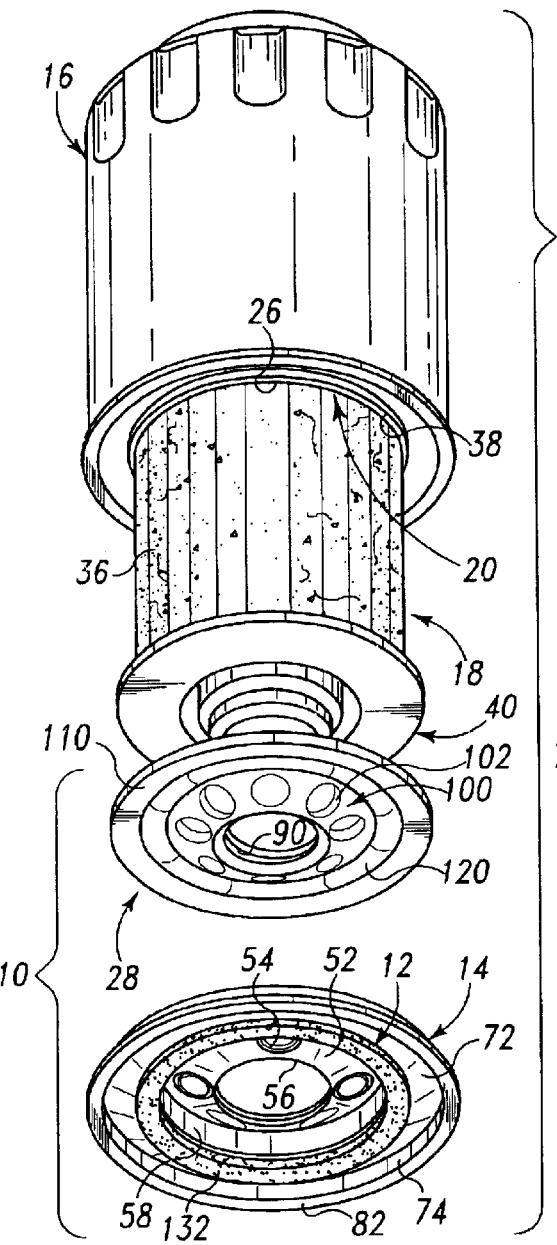
FIG. 1 is an exploded perspective assembly view of components that can be assembled to produce the fluid filter shown in FIGS. 2 and 4 to filter a fluid such as oil, the components including (from top to bottom) a filter housing, a filter module extending into a filter chamber formed in the filter housing, a round bearing plate under the filter module, and a round filter retainer carrying an insert-molded sealing ring that is anchored to the filter retainer and adapted to establish a fluid seal between the fluid filter and the engine as shown, for example, in FIG. 4.
Figure 2:
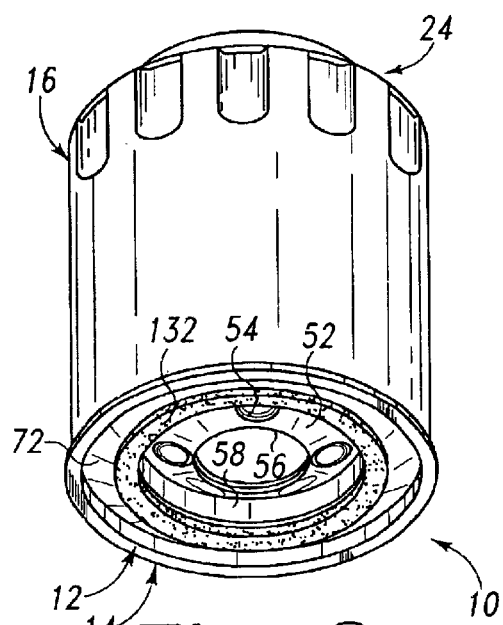
FIG. 2 is a perspective view of the fluid filter of FIG. 1 showing the filter retainer coupled to a lower annular edge of the filter housing to retain the filter module and the bearing plate inside the filter housing and showing a downwardly facing annular sealing strip included in the sealing ring and located on an exterior side of the filter retainer to engage an exterior surface of an engine block in the manner shown in FIG. 4.
Figure 3:
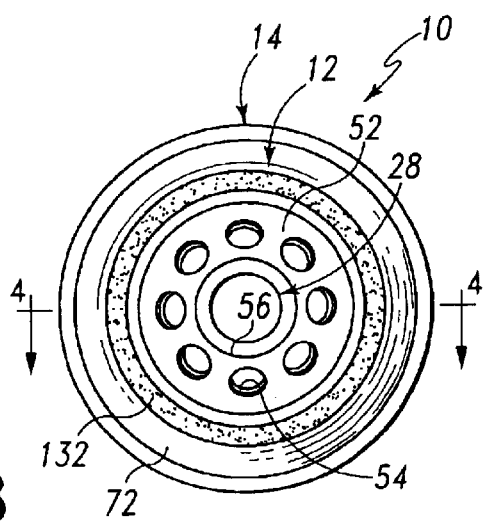
FIG. 3 is a bottom view of the fluid filter of FIG. 2 showing a central oil outlet port formed in the bearing plate and a set of eight oil inlet ports established by the bearing plate and filter retainer and located to surround the central oil outlet port and showing the downwardly facing annular sealing strip located to surround the eight oil inlet ports.
Figure 4:
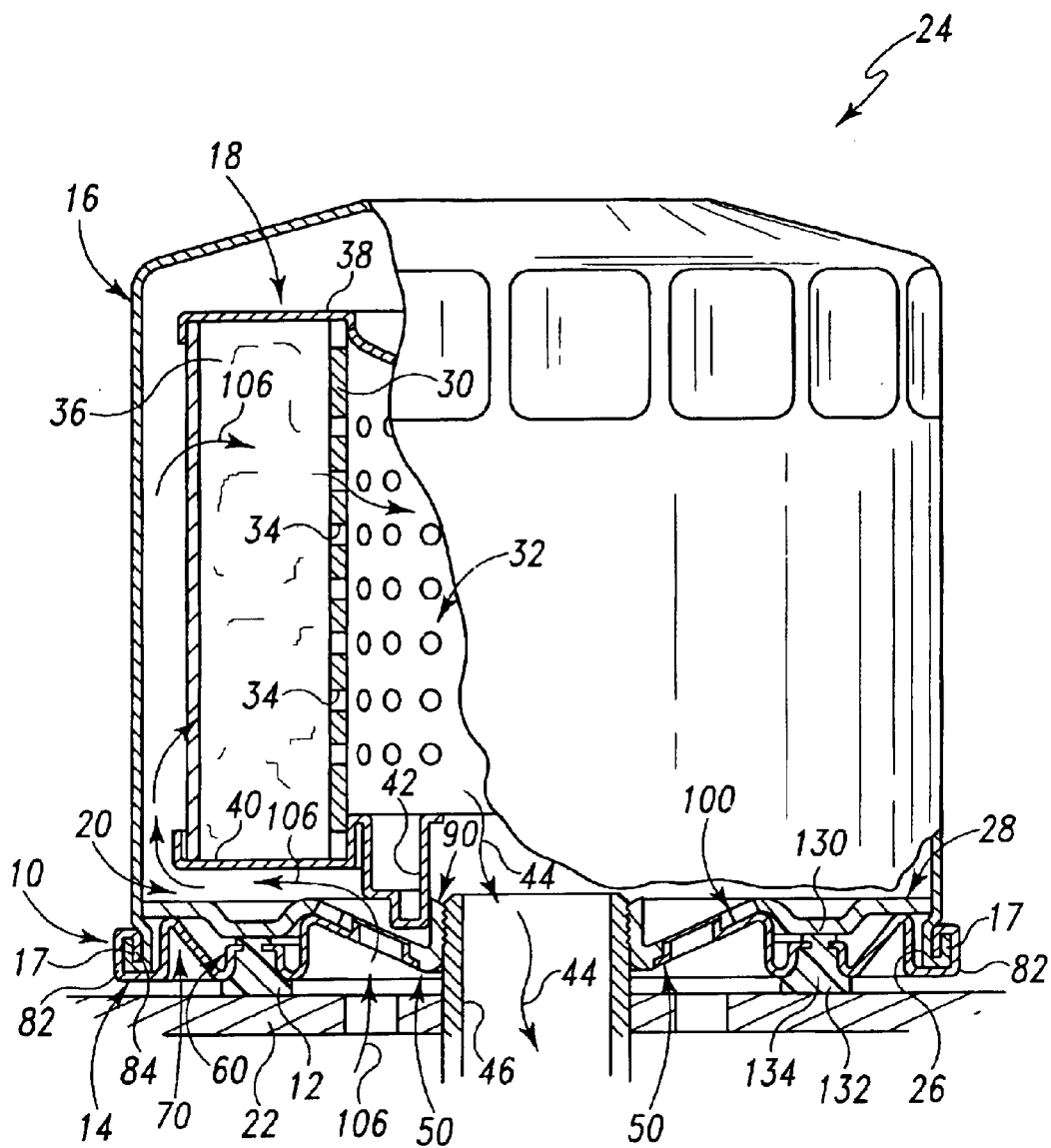
FIG. 4 is a sectional view taken along line 4—4 of FIG. 3 showing oil flowing into the filter housing through one of the oil inlet ports to pass through the filter module and exit the filter housing through the central oil outlet port and showing engagement of the downwardly facing annular sealing strip with an engine and showing cooperation of the filter retainer, sealing ring, and bearing plate to form a closure coupled to the filter housing at the opening into the filter chamber to retain the filter module in the filter chamber.
Figure 7:
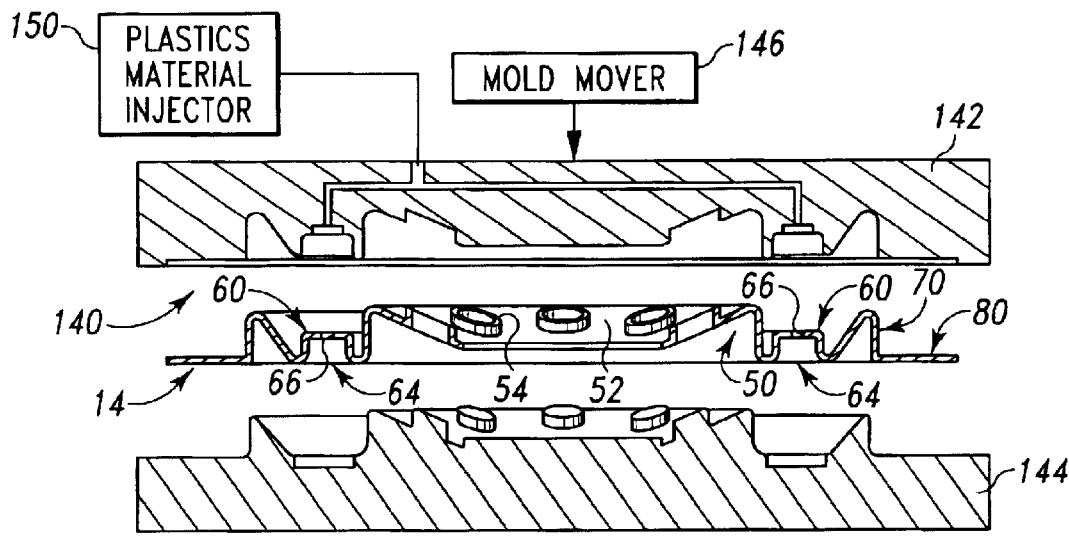
FIGS. 7 to 9 show a series of diagrammatic insert-molding steps in which the sealing ring is molded in a mold cavity containing the filter retainer to anchor the sealing ring to the filter retainer.
Figure 8:
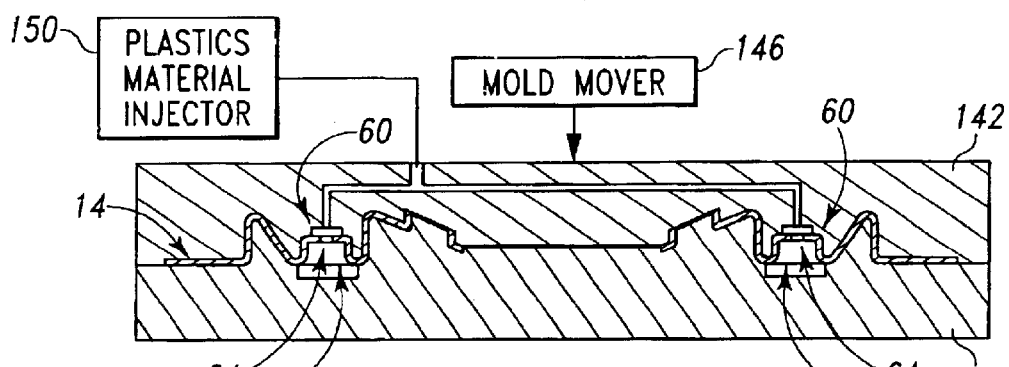
Figure 9:
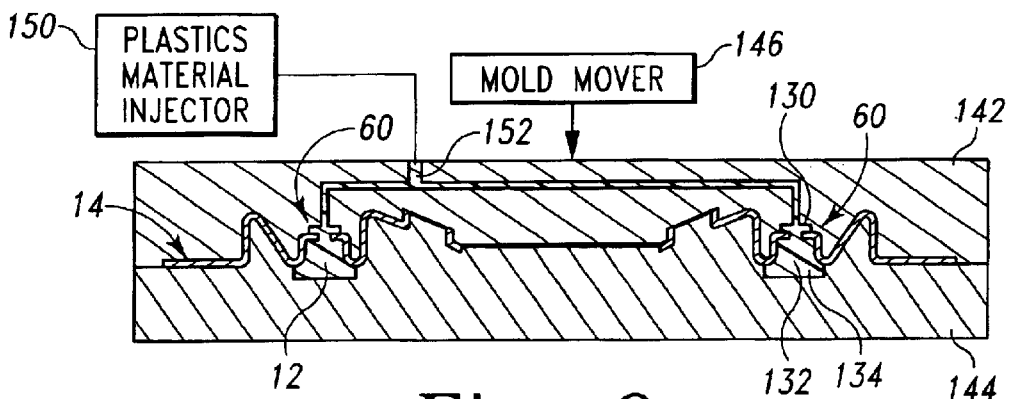

A fluid filter closure 10 includes a sealing ring 12 anchored to a filter retainer 14 as shown, for example, in FIGS. 1 and 4. Filter retainer 14 is coupled to a filter housing 16 to retain a filter module 18 in a filter chamber 20 formed in filter housing 16 as shown in FIG. 4. Sealing ring 12 is anchored to filter retainer 14 using, for example, an "insert-molding" process illustrated in FIGS. 7–9. Sealing ring 12 is arranged to establish a sealed connection with an engine block 22 once a fluid filter assembly 24 comprising filter housing 16, filter module 18, and fluid filter closure 10 is mounted on engine block 22 as suggested in FIG. 4. Although fluid filter assembly 24 represents an oil filter assembly, it is within the scope of this disclosure to configure filter assembly 24 to filter, for example, oil, fuel, coolant, hydraulic fluids, and other fluids associated with engines.

As suggested in FIG. 1, fluid filter assembly 24 is produced by inserting filter module 18 into filter chamber 20 through an open mouth 26 formed at one end of filter housing 16. Closure 10, which comprises sealing ring 12, filter retainer 14, and a bearing plate 28 (located between filter retainer 14 and filter module 18 in the illustrated embodiment) is then coupled to filter housing 16 at open mouth 26 to retain filter module 18 in filter chamber 20 as shown, for example, in FIG. 4.

As suggested in FIG. 4, filter module 18 includes a center tube 30 formed to include a filtered-fluid region 32 and a plurality of oil-discharge apertures 34 opening into the filtered-fluid region 32. Filter module 18 also includes a pleated filter media 36 surrounding center tube 30 and lying in a space between first and second end caps 38, 40 coupled to center tube 30. It is within the scope of this disclosure to use any suitable filter module 18 containing any suitable filter media 36 to filter contaminants from oil (or other fluid) flowing through filter housing 16. In the illustrated embodiment, second end cap 40 is formed to include an oil discharge sleeve 42 through which filtered oil 44 can flow as it exits filtered-fluid region 32 in center tube 30 and passes through an engine tube 46 into engine block 22 as suggested in FIG. 4.

Figure 5:
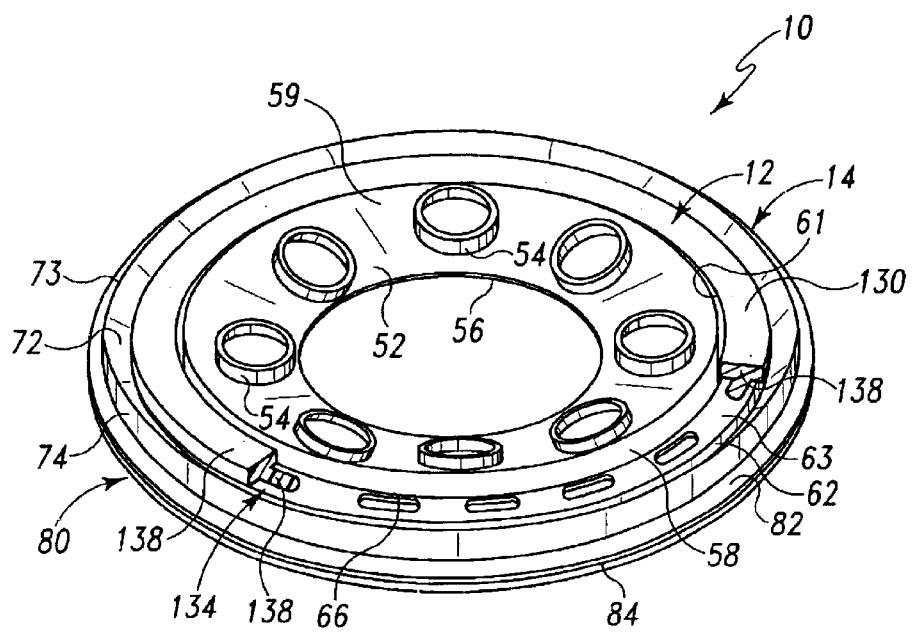
FIG. 5 is an enlarged perspective view of the filter retainer and about three-quarters of the sealing ring anchored to the filter retainer and showing a portion of an upwardly facing annular sealing strip included in the sealing ring and portions of two of the twelve connector links included in the sealing ring and arranged to pass through connector apertures formed in the filter retainer to help connect the upwardly facing annular sealing strip to the downwardly facing annular sealing strip.
Figure 6:
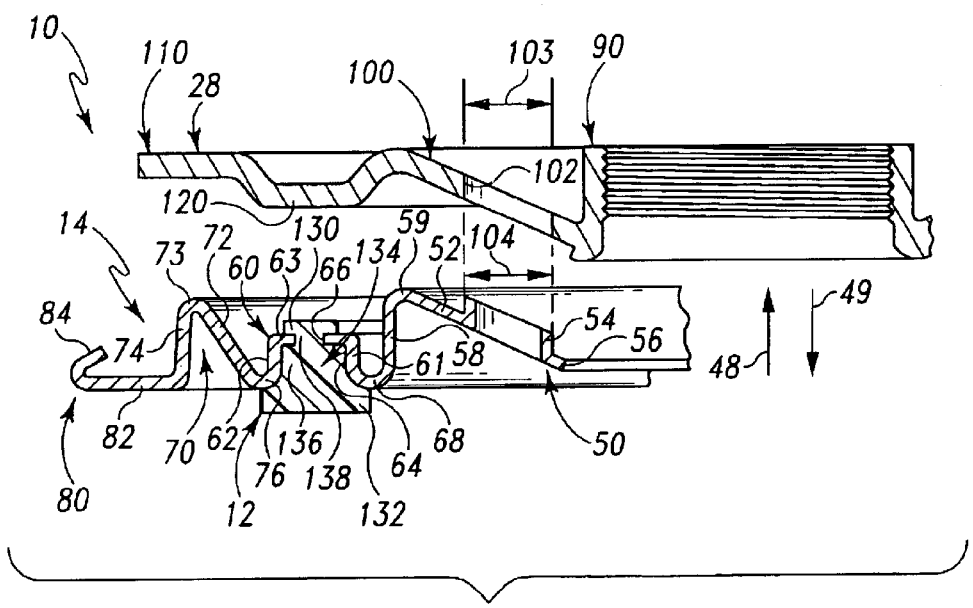
FIG. 6 is an enlarged sectional view of the filter retainer, "bell-shaped" sealing ring, and bearing plate, with portions broken away, before the bearing plate is coupled to the filter retainer and showing one of the connector links included in an upper portion of the connector and arranged to extend through one of the connector apertures to reach the upwardly facing annular sealing strip and showing a lower portion of the connector arranged to lie in an annular channel formed in a ring mount provided in the filter retainer to merge with the downwardly facing annular sealing strip.

Various features of filter retainer 14 are shown in greater detail in FIGS. 5 and 6. Filter retainer 14 is made of metal in the illustrated embodiment.

A radially inner portion 50 of filter retainer 14 includes an inclined annular ramp 52 formed to include a series of eight circumferentially spaced-apart inlet flow conductor sleeves 54 arranged to extend upwardly in direction 48. Inclined annular ramp 52 terminates at a circular inner edge 56. Radially inner portion 50 also includes an upright annular sleeve 58 coupled to an outer peripheral portion 59 of inclined annular ramp 52 and arranged to extend downwardly therefrom in direction 49.

A ring mount 60 of filter retainer 14 includes annular inner and outer side walls 61, 62 and an annular ceiling wall 63 arranged to interconnect inner and outer side walls 61, 62 as shown in FIGS. 5 and 6. These walls 61, 62, and 63 cooperate to form an annular channel 64 that opens downwardly as shown best in FIG. 6. Annular ceiling wall 63 is formed to include a series (e.g., twelve) of circumferentially spaced-apart connector apertures 66 arranged to open into annular channel 64 as suggested in FIGS. 5 and 6. Each connector aperture 66 has an oblong shape in the illustrated embodiment. During an insert-molding process shown, for example, in FIGS. 7 to 9, plastics material will flow into annular channel 64 and each of connector apertures 66 during molding of sealing ring 12 to anchor sealing ring 12 to ring mount 60 of filter retainer 14. Ring mount 60 is arranged to surround radially inner portion 50 and a lower portion of annular inner wall 61 is coupled to a lower portion of upright annular sleeve 58 at rim 68 to locate annular ring mount 60 in a fixed position relative to radially inner portion 50.

An outer bearing plate support 70 of filter retainer 14 includes an inclined annular ramp 72 and an upright annular sleeve 74 arranged to surround inclined annular ramp 72 and coupled to an outer peripheral portion thereof at annular rim 73. Outer bearing plate support 70 is arranged to surround annular ring mount 60 and a lower portion of inclined annular ramp 72 is coupled to a lower portion of annular outer side wall 62 at rim 76 to locate annular outer bearing plate support 70 in a fixed position relative to annular ring mount 60.

A radially outer annular housing mount 80 of filter retainer 14 includes an annular plate 82 and an inclined annular lip 84 coupled to an outer portion of annular plate 82 as shown, for example, in FIG. 6. This annular housing mount 80 can be manipulated as suggested in FIG. 4 to mate and lock with a peripheral portion 17 of filter housing 16 to couple filter retainer 14 of closure 10 to filter housing 16.

Various features of bearing plate 28 are shown in greater detail in FIG. 6. Bearing plate 28 is made of metal in the illustrated embodiment.

An engine mount sleeve 90 of bearing plate 28 is configured to mate with engine tube 46 as suggested in FIGS. 4 and 6. Such a coupling allows filtered oil 44 to flow from filtered-fluid region 32 in filter module 18 into engine block 22.

An annular inner retainer mount 100 of bearing plate 28 is coupled to radially inner portion 50 of filler retainer 14. Illustratively, each inlet flow conductor sleeve 54 is arranged to extend into one of the eight oil inlet ports 102 formed in inner retainer mount 100 and arranged to lie in circumferentially spaced-apart relation to one another as suggested in FIGS. 4 and 5 to establish an interference-fit coupling between bearing plate 28 and filter retainer 14. Dimensions 103 and 104 are selected to effect this interference fit. Each inlet flow conductor sleeve 54 is formed to conduct unfiltered oil 106 therethrough as suggested in FIG. 4 to admit unfiltered oil 104 from engine block 22 through oil inlet ports 102 formed in bearing plate 28 into filter chamber 20 formed in filter housing 16. It is within the scope of this disclosure to omit inlet flow conductor sleeves 54 and couple bearing plate 28 to filter retainer 14 by extending pins through at least some of oil inlet ports 102 and openings formed in filter retainer 14 at the site of inlet flow conductor sleeves 54 to align bearing plate 28 properly relative to filter retainer 14 and then spot-welding or projection-welding bearing plate 28 to filter retainer 14.

An annular radially outer retainer mount 110 of bearing plate 28 is arranged to surround annular inner retainer mount 100 and engage annular rim 73 of filter retainer 14. Outer retainer mount 110 is arranged to lie in radially spaced-apart relating to inner retainer mount 100 as suggested in FIG. 6.

An annular seat 120 of bearing plate 28 is located between inner and outer retainer mounts 100, 110 as suggested in FIGS. 1 and 6. Annular seat 120 is arranged to engage sealing ring 12 anchored to filter retainer 14 as suggested in FIG. 4 to establish a sealed connection therebetween, Sealing ring 12 includes an upwardly facing annular sealing strip 130 (as shown in FIGS. 5 and 6), a downwardly facing annular sealing strip 132 (as shown in FIGS. 1–3 and 6), and a connector 134 arranged to lie in annular channel 64 and connector apertures 66 formed in ring mount 60 of filter retainer 14 (as shown in FIG. 6) to anchor upwardly and downwardly facing annular sealing strips 130, 132 on filter retainer 14. Downwardly facing annular sealing strip 132 is arranged to lie below annular inner and outer side walls 61, 62 and outside the annular channel 64 formed therebetween. Connector 134 includes an annular lower portion 136 arranged to lie in annular channel 64 and mate with downwardly facing annular sealing strip 132. Connector 134 also includes an upper portion comprising a set of connector links 138 wherein each connector link 138 extends through one of the connector apertures 66 (as suggested in FIGS. 5 and 6) to interconnect annular lower portion 136 of connector 134 and upwardly facing annular sealing strip 130. Sealing ring 12 has a bell-shaped transverse cross-sectional shape as shown, for example, in FIG. 6.

Each connector link 138 has a width that is less than the width of annular lower portion 136 of connector 134 as shown in FIG. 6. Also, the width of the downwardly facing annular sealing strip 132 is greater than the widths of the upwardly facing annular sealing strip 130, each connector link 138, and the annular lower portion 136 of connector 134 as suggested in FIG. 6.

Upwardly facing annular sealing strip 130 is arranged to mate with and seal against annular seat 120 of bearing plate 28 while downwardly facing annular sealing strip 132 is arranged to mate with and seal against an exterior surface of engine block 22 as shown, for example, in FIG. 4. Thus, a sealed connection is established between engine block 22 and oil filter assembly 24 so that unfiltered oil 106 flows from engine block 22 into filter chamber 20 to reach filter module 18 and filtered oil 44 flows from filtered-fluid region 32 in center tube 30 back into engine block 22 via oil discharge sleeve 42 and engine tube 46.

In an illustrative process, sealing ring 12 is anchored to filter retainer 14 in the following manner. Filter retainer 14 is first positioned in a space 140 between separated upper and lower mold portions 142, 144 as shown, for example, in FIG. 7. Mold mover 146 is used to move upper and lower molds 142, 144 to mate to form a sealing ring mold cavity 148 containing a portion of filter retainer 14 as shown, for example, in FIG. 8. Then, plastics material injector 150 is used to inject a plastics material 152 through channels formed in lower mold portion 144 to fill sealing ring mold cavity 148 as shown, for example, in FIG. 9, thereby to overmold filter retainer 14 with plastics material 152 to produce a sealing ring 12 anchored to filter retainer 14. As plastics material 152 begins to fill mold cavity 148, it will flow freely around ring mount 60 of filter retainer 14 to conjoin annular sealing strips 130 and 132 and establish a mechanical lock for sealing ring 12. The filter retainer 14 includes means 60 for anchoring the sealing ring 12 in a predetermined position relative to radially outer and inner portions of filter retainer 14 during molding of a plastics material 152 in a mold cavity 148 to produce the sealing ring 12 and to support the sealing ring 12 in engagement with annular seat 120 included in bearing plate 28 to establish a sealed connection between bearing plate 28 and sealing ring 12 upon coupling radially inner portion 50 of filter retainer 14 to bearing plate 28.

I claim:

1. A fluid filter assembly comprising
a filter housing formed to include a filter chamber and an opening into the filter chamber,
a filter module located in the filter chamber, and
a closure coupled to the filter housing at the opening to retain the filter module in the filter chamber, the closure including a filter retainer coupled to the filter housing and formed to include at least one connector aperture and a sealing ring coupled to the filter retainer, the seating ring including an upwardly facing annular sealing strip arranged on one side of the filter retainer to face upwardly toward the filter module, a downwardly facing annular sealing strip arranged on an opposite side of the filter retainer to face downwardly away from the filter module, and a connector arranged to extend through each connector aperture formed in the filter retainer to anchor the upwardly and downwardly facing annular strips on the filter retainer, the closure including a bearing plate that is positioned to lie between the filter module and the filter retainer and that is discrete from the sealing ring, the bearing plate being formed to include an inlet port to admit fluid into the filter chamber and an outlet port to discharge fluid from the filter chamber, the bearing plate including an annular seat which the upwardly facing annular sealing strip engages to establish a sealed connection between the bearing plate and the sealing ring, the upwardly facing annular sealing strip being positioned radially outwardly from the inlet port.

2. The filter assembly of claim 1, wherein the sealing ring has a bell-shaped transverse cross-sectional shape.

3. The filter assembly of claim 1, wherein the filter retainer includes a ring mount formed to include each connector aperture and an annular channel underlying and communicating with each connector aperture, the connector includes an annular lower portion arranged to lie in the annular channel and mate with the downwardly facing annular sealing strip and an upper portion comprising a set of connector links, and each connector link extends through one of the connector apertures formed in the ring mount to interconnect the annular lower portion of the connector to the upwardly facing annular sealing strip.

4. The filter assembly of claim 3, wherein the ring mount includes an annular ceiling wall defining a boundary of the annular channel and formed to include a plurality of circumferentially spaced-apart connector apertures and each of the plurality of circumferentially spaced-apart connector apertures contains one of the connector links.

5. The filter assembly of claim 4, wherein the ring mount further includes an annular inner side wall coupled to the annular ceiling wall and an annular outer side wall coupled to the annular ceiling wall and arranged to surround the annular outer side wall to form the annular channel therebetween and contain the annular lower portion of the connector therein, and the downwardly facing annular sealing strip is arranged to lie below the annular inner and outer side walls and outside the annular channel formed therebetween.

6. The filter assembly of claim 3, wherein the filter retainer further includes a radially outer annular housing mount coupled to the filter housing at the opening into the filter chamber and a radially inner portion formed to include at least one oil inlet aperture arranged to admit oil into the filter chamber and the ring mount is arranged to lie in a location between the radially outer annular housing mount and the radially inner portion.

7. The filter assembly of claim 6, wherein the bearing plate includes an inner retainer mount coupled to the radially inner portion of the filter retainer and a radially outer retainer mount arranged to surround the inner retainer mount, and the annular seat is located between the outer and inner retainer mounts.

8. The filter assembly of claim 7, wherein the filter retainer further includes an outer beating plate support located between the radially outer annular housing mount and the ring mount and the outer bearing plate support is arranged to engage the radially outer retainer mount of the bearing plate.

9. The filter assembly of claim 3, wherein each connector link has a width that is lesser than a width of the annular lower portion of the connector.

10. The filter assembly of claim 9, wherein the upwardly facing annular sealing strip has a width and the downwardly facing annular sealing strip has a width that is greater than the widths of the upwardly facing annular sealing strip, each connector link, and the annular lower portion of the connector.

11. The filter assembly of claim 1, wherein the beating plate is formed to include a plurality of oil inlet ports arranged to admit oil into the filter chamber to reach and flow through the filter module, the annular seat is arranged to surround the oil inlet ports, the filter retainer includes a radially inner portion formed to include a plurality of inlet flow conductor sleeves, each inlet flow conductor sleeve is arranged to extend into one of the oil inlet ports formed in the bearing plate to establish an interference-fit coupling between the bearing plate and the filter retainer to anchor the bearing plate in a fixed position on the filter retainer, each inlet flow conductor sleeve is formed to conduct oil therethrough to admit oil through the oil inlet ports into the filter chamber, and the sealing ring is anchored in a fixed position on the filter retainer to cause the upwardly facing annular scaling strip to engage the annular seat included in the bearing plate.

12. The filter assembly of claim 11, wherein the bearing plate further includes a radially outer retainer mount positioned to surround the annular seat, the filter retainer includes a radially outer annular housing mount coupled to the filter housing at the opening into the filter chamber and an outer bearing plate support located between the sealing ring and the radially outer annular housing mount, and the outer bearing plate support is arranged to engage the radially outer mount of the bearing plate.

13. A fluid filter assembly comprising a filter housing formed to include a filter chamber and an opening into the filter chamber, a filter module located in the filter chamber, a bearing plate formed to include a central oil outlet port to discharge oil from the filter chamber, a series of oil inlet ports arranged to surround the central oil outlet port to admit oil into the filter chamber, and an annular seat arranged to surround the series of oil inlet ports, a sealing ring molded of a plastics material, and a filter retainer including a radially outer portion coupled to the filter housing and a radially inner portion coupled to the bearing plate to establish the bearing plate in a fixed position relative to the outer housing at the opening into the filter chamber, the filter retainer further including means for anchoring the sealing ring in a predetermined position between the radially outer and inner portions of the filter retainer during molding of a plastics material in a mold cavity to produce the sealing ring and to support the seating ring in engagement with the annular seat included in the bearing plate to establish a sealed connection between the bearing plate and the sealing upon coupling the radially inner portion of the filter retainer to the bearing plate, wherein the means for anchoring includes an annular inner side wall, an annular outer side wall arranged to surround the annular inner side wall, and an annular ceiling wall arranged to interconnect the annular inner and outer side walls to define an annular channel therebetween and wherein the annular ceiling wall is formed to include at least one connector aperture opening into the annular channel and the sealing ring includes a connector arranged to occupy the annular channel and the at least one connector aperture.

14. The filter assembly of claim 13, wherein the sealing ring further includes an upwardly facing annular sealing strip coupled to an upper portion of the connector extant in the at least one connector aperture and arranged to engage the annular seat included in the bearing plate.

15. The filter assembly of claim 14, wherein the sealing ring further includes a downwardly facing annular sealing strip coupled to an annular lower portion of the connector extant in the annular channel and adapted to engage a portion of an engine block associated with the filter housing.

16. The filter assembly of claim 13, wherein the annular inner side wall is coupled to the radially inner portion of the filter retainer and is arranged to surround the radially inner portion of the filter retainer.

17. The filter assembly of claim 13, wherein the filter retainer further includes an outer bearing plate support located between the radially outer portion and the means for anchoring and arranged to engage a radially outer periphery of the bearing plate.

18. A fluid filter assembly comprising a filter housing formed to include a filter chamber and an opening into the filter chamber, a filter module located in the filter chamber, a bearing plate formed to include a central oil outlet port to discharge oil from the filter chamber, a series of oil inlet ports arranged to surround the central oil outlet port to admit oil into the filter chamber, and an annular seat arranged to surround the series of inlet ports, a sealing ring engaging the annular seat to establish a sealed connection between the bearing plate and the sealing ring, and a filter retainer including a radially outer portion coupled to the filter housing and a radially inner portion coupled to the bearing plate to establish the bearing plate in a fixed position relative to the filter housing at the opening into the filter chamber, the filter retainer further including a ring mount that is positioned between the radially outer portion and the radially inner portion and includes an annular inner side wall, and an annular outer side wall arranged to surround the annular inner side wall, and an annular ceiling wall arranged to interconnect the annular inner and outer side walls to define an annular channel therebetween, the annular ceiling wall being formed to include at least one connector aperture opening into the annular channel, the sealing ring including a connector arranged to occupy the annular channel and the at least one connector aperture.

* * * * *